(12) United States Patent
Kobayashi et al.

(10) Patent No.: US 6,493,102 B1
(45) Date of Patent: *Dec. 10, 2002

(54) FACSIMILE METHOD AND APPARATUS FOR COMMUNICATING AND STORING RECEIVING STATION COMMUNICATION INFORMATION

(75) Inventors: Makoto Kobayashi, Yokohama (JP); Toru Maeda, Mitaka (JP); Akira Matsui, Tokyo (JP); Seiji Ohmori, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/502,764

(22) Filed: Jul. 14, 1995

(30) Foreign Application Priority Data

Jul. 18, 1994 (JP) .............................................. 6-187759
Jun. 8, 1995 (JP) .............................................. 7-167038

(51) Int. Cl.[7] .......................... G06F 13/00; H04N 1/00; H04N 1/32
(52) U.S. Cl. ....................... 358/1.15; 358/434; 358/442
(58) Field of Search ................................ 358/434, 435, 358/436, 437, 438, 439, 440, 400, 405, 426, 1.15, 442, 468, 412, 406; 379/100.01, 100.06; 375/222; H04N 1/00, 1/32

(56) References Cited

U.S. PATENT DOCUMENTS

| | | | |
|---|---|---|---|
| 4,586,086 | * 4/1986 | Ohzeki | 358/256 |
| 4,785,355 | * 11/1988 | Matsumoto | 358/257 |
| 4,910,506 | * 3/1990 | Yoshida et al. | 358/400 |
| 4,999,716 | * 3/1991 | Nakamura | 358/434 |
| 5,041,918 | * 8/1991 | Ishida et al. | 358/442 |
| 5,125,025 | * 6/1992 | Lim | 358/434 |
| 5,216,705 | 6/1993 | Yoshida et al. | 358/440 |
| 5,274,474 | * 12/1993 | Medina | 358/435 |
| 5,303,066 | * 4/1994 | Kawaguchi | 358/434 |
| 5,361,138 | * 11/1994 | Motegi et al. | 358/400 |
| 5,488,483 | * 1/1996 | Murayama | 358/426 |

FOREIGN PATENT DOCUMENTS

JP 0678072 * 3/1994

* cited by examiner

*Primary Examiner*—Madeleine Nguyen
(74) *Attorney, Agent, or Firm*—Fitzpatrick, Cella, Harper & Scinto

(57) ABSTRACT

There is described a facsimile device which includes a first transmitting device that transmits previously stored communication information of a receiving device to the receiving device; and, in response to such transmission, the receiving device compares that communication information with its own communication information. When the comparison shows a difference, a second transmitting device, which is associated with the receiving device, transmits new communication information back to the first transmitting device; and, in response to this, the first transmitting device updates the stored communication information.

27 Claims, 15 Drawing Sheets

| FIG. 8A |
|---|
| FIG. 8B |

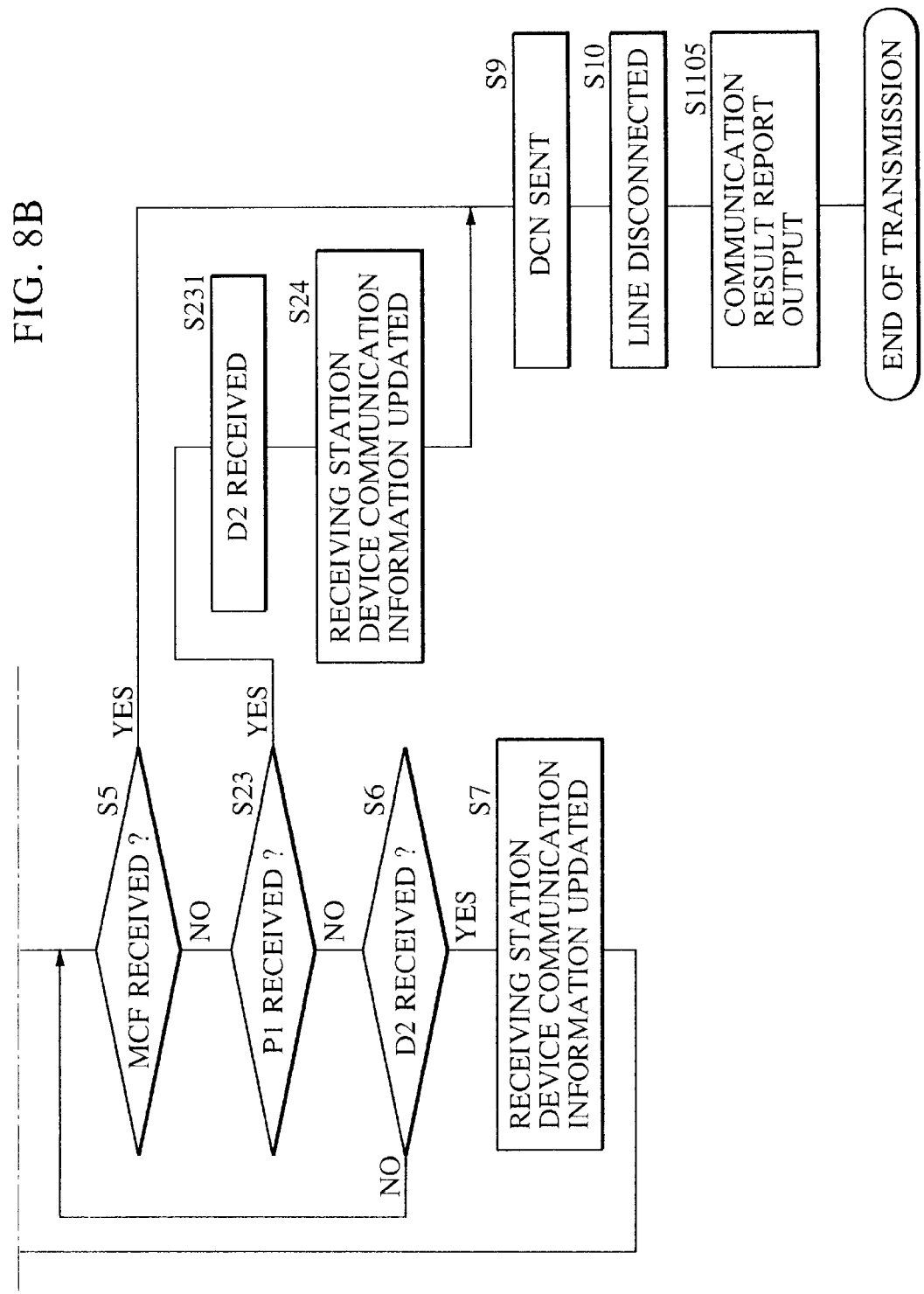

FACSIMILE METHOD AND APPARATUS FOR COMMUNICATING AND STORING RECEIVING STATION COMMUNICATION INFORMATION

BACKGROUND OF THE INVENTION

1. Field of the Invention

The present invention relates to a facsimile device having one-touch dialing and abbreviated dialing functions.

2. Description of the Related Art

Hitherto, there have been known facsimile devices in which communication information such as, for example, receiving station names and image transmission speeds, are stored in accordance with the receiving stations with which communication is carried out registered by means of the one-touch dialing function or the abbreviated dialing function to record the name of the receiving station in the communication management report or to shorten the communication time.

However, such conventional facsimile devices do not have any means to update by communication the communication information regarding receiving devices of the receiving stations with which communication is carried out which are stored at the transmitting side. Therefore, when changes are made in the communication information regarding the receiving side, differences arise between the communication information regarding each of these receiving devices of the receiving stations stored at the transmitting side and the communication information at the receiving side, so that extra time may be taken to complete the communication, wrong information may be written in the communication management report, etc.

SUMMARY OF THE INVENTION

An object of the present invention is to provide an improved facsimile device.

Another object of the present invention is to provide a facsimile device capable of allowing proper communication and report output by proper updating management of communication information regarding the receiving station device with which communication is carried out.

DETAILED DESCRIPTION OF THE PREFERRED EMBODIMENTS

Figure 1:
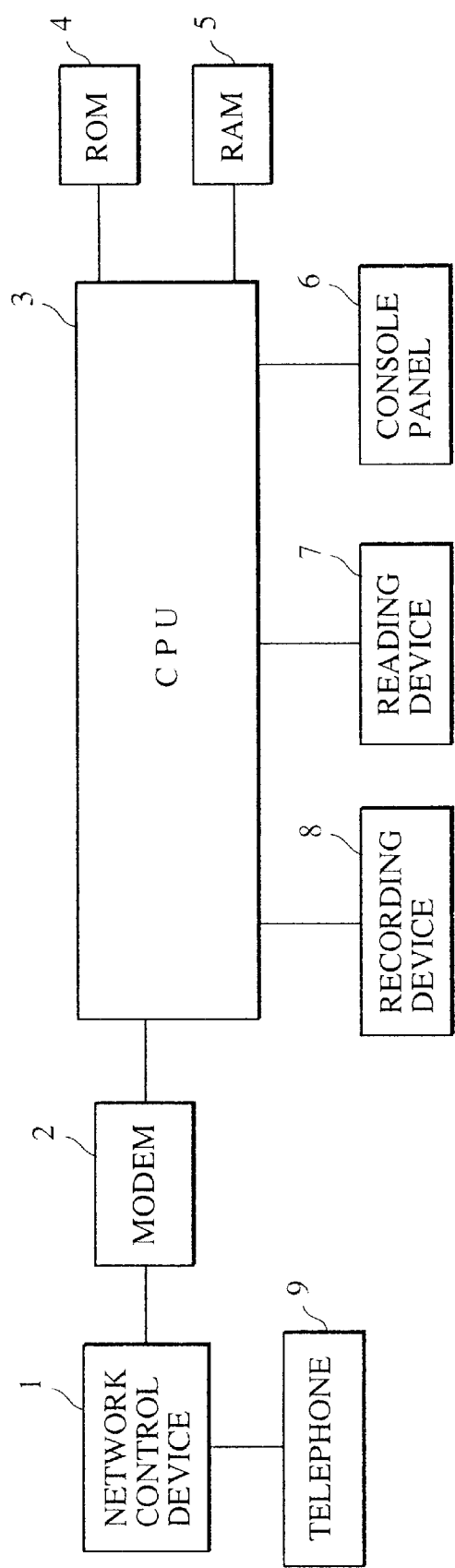
FIG. 1 is a block diagram of a construction of embodiments of the present invention.

FIG. 1 is a block diagram of a construction of a facsimile device common to the embodiments of the present invention.

The facsimile device has a network control device 1 for controlling public line networks, a modem 2 for modulating and demodulating a digital signal and an analog signal, a CPU 3 for controlling the entire facsimile device, ROM 4 for storing a program, RAM 5 which provides work area, a console panel 6 for performing operation, a reading device 7 for reading an original, a recording device 8 for printing information onto recording paper, and a telephone 9 for communication.

Figure 2:
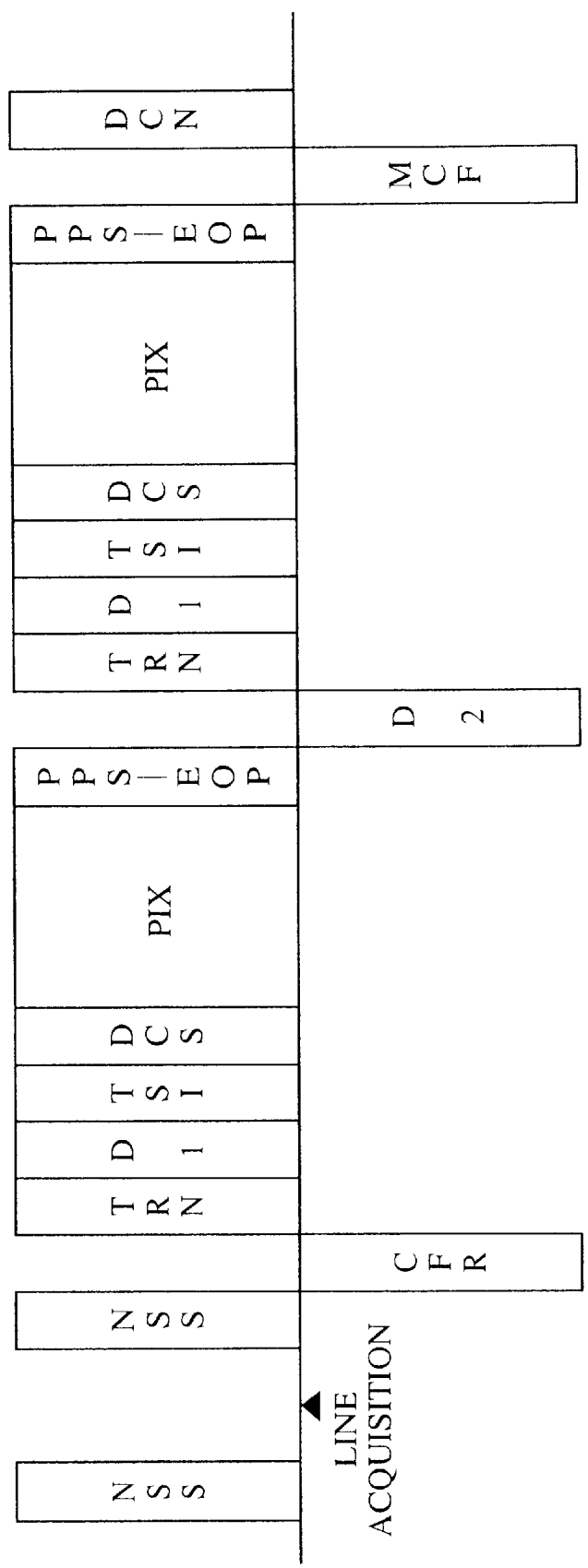
FIG. 2 is an explanatory view of a communication procedure system in a first embodiment.
Figure 3:
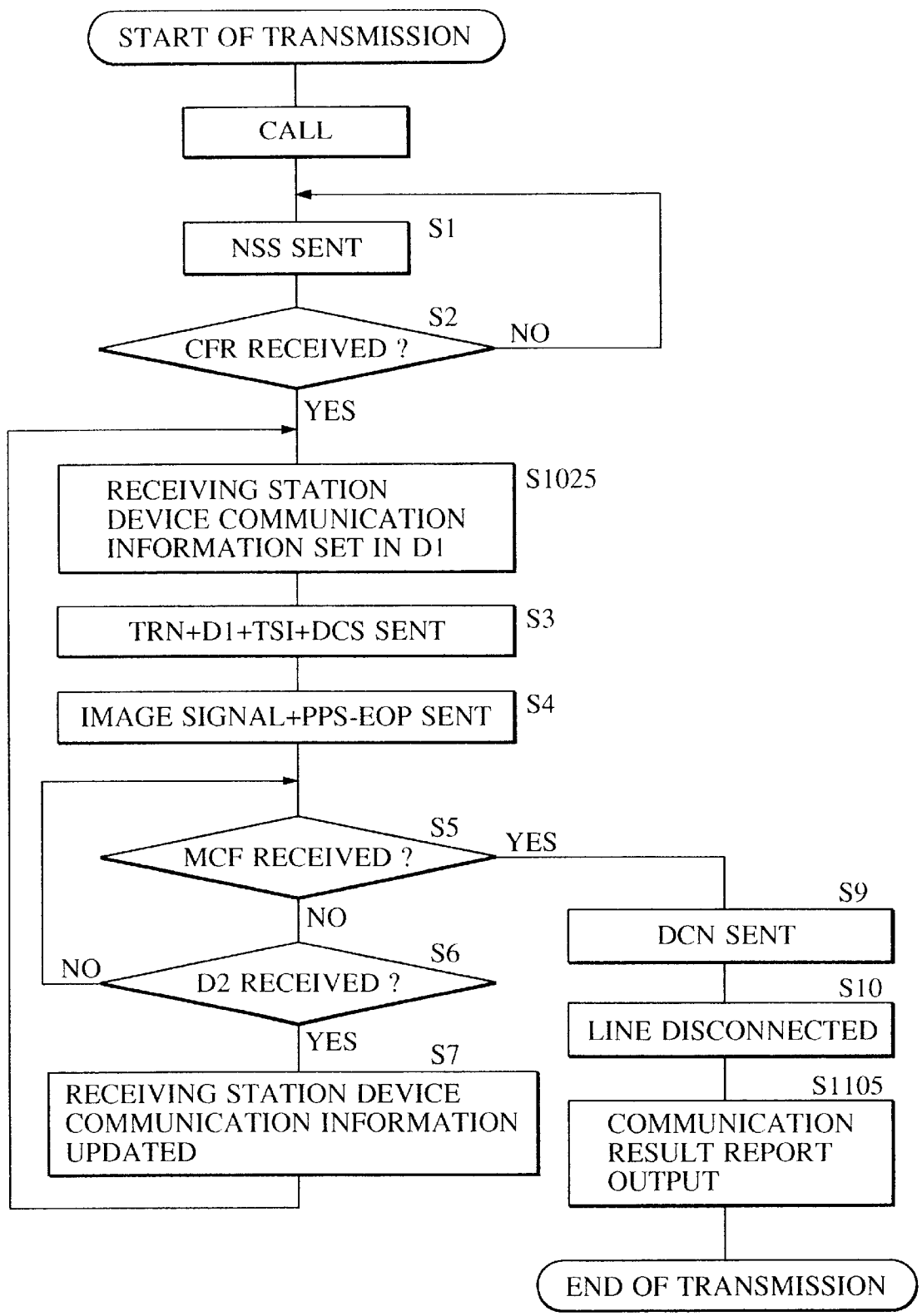
FIG. 3 is a flow chart of operation of a transmitting device in the aforementioned first embodiment.
Figure 4:
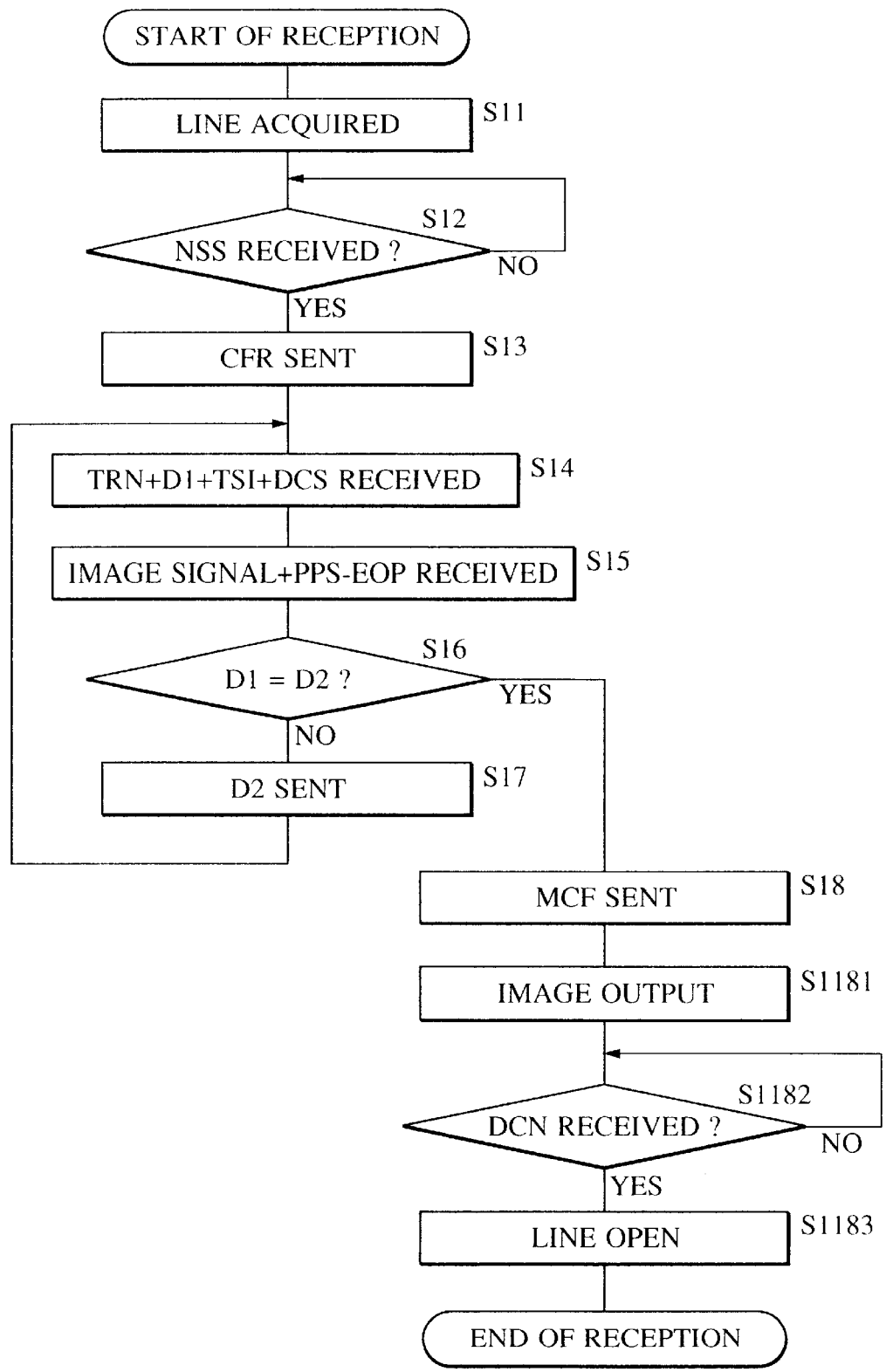
FIG. 4 is a flow chart of operation of a receiving device in the first embodiment.
Figure 10:
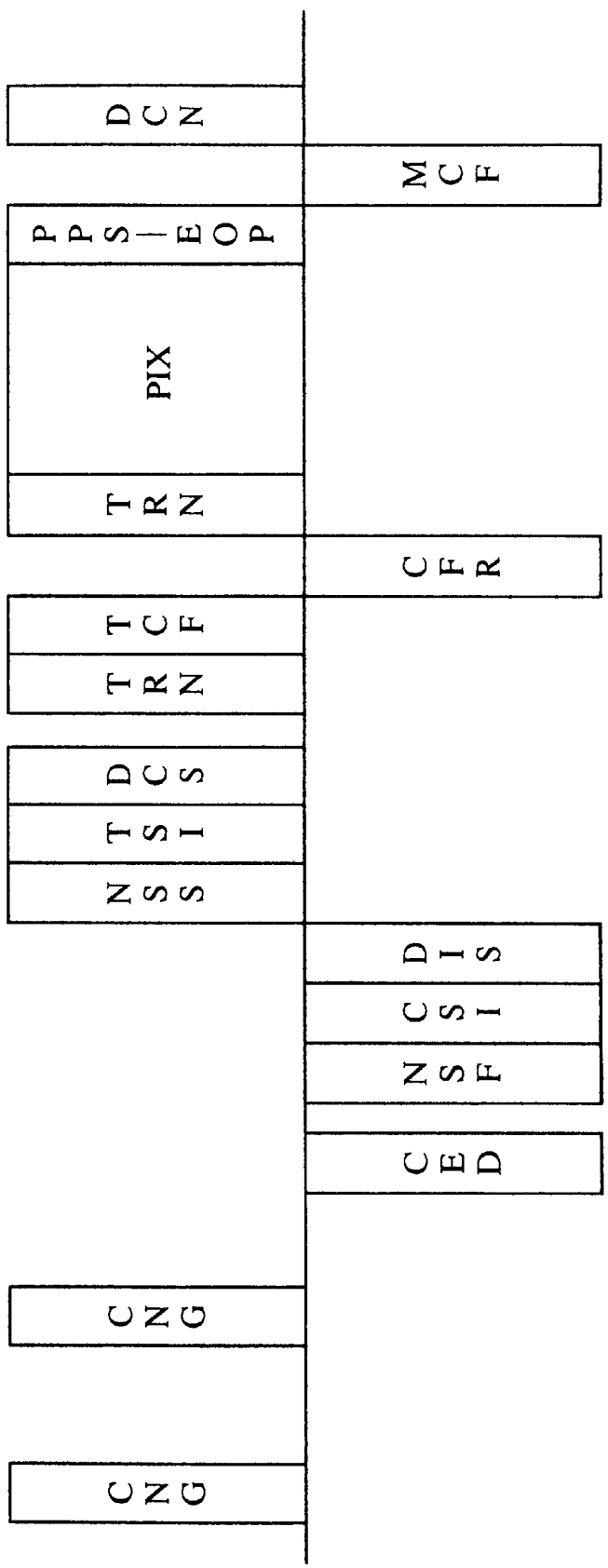
FIG. 10 is an explanatory view of a conventional communication procedure in conformity with T. 30.

FIG. 10 is an explanatory view of a conventional communication procedure in conformity with T. 30. FIG. 2 is an explanatory view of a communication procedure system in a first embodiment in correspondence with the first and third claims of the present invention. FIG. 3 is a flow chart of the operation of a transmitting device in the aforementioned first embodiment. FIG. 4 is a flow chart of the operation of a receiving device in the first embodiment.

In the facsimile devices of each of the embodiments described below, when it functions as a transmitting device, it repeatedly transmits a non-standard set-up signal (hereinafter referred to as "NSS") at a fixed interval immediately following dialing (S1) and upon reception of a confirmation to receive signal (hereinafter referred to as "CFR") (S2), performs high-speed transmission of information previously stored in accordance with the receiving stations. On the other hand, when it functions as a receiving device, immediately after line acquisition (S11) (FIG. 4), it receives NSS (S12), and sends out CFR (S13), after which it subsequently performs high-speed reception.

In the first embodiment of the present invention, after reception of CFR (S2) (FIG. 3), the previously stored information of the receiving station device with which communication is carried out is set in D1 (S1025), so as to allow the transmitting device to transmit high-speed modem training (hereinafter referred to as "TRN"), stored communication information regarding the receiving station device with which communication is carried out (hereinafter referred to as "D1" and described in detail below), a transmitting subscriber identification signal (hereinafter referred to as "TSI"), and digital command signal (hereinafter referred to as "DCS") (S3). Thereafter, it successively transmits after these signals an image signal (hereinafter referred to as "PIX"), and partial page signal-end of procedure signal (hereinafter referred to as "PPS-EOP"), employing error correction function (S4). That is, it executes image signal transmission without waiting for a signal from the receiving station following the transmission of communication information of the receiving station.

It is to be noted that in S3 and S4 of FIG. 3, the signals are successively transmitted at a high speed by employing data of the capacity of a high-speed modem of the receiving station device with which communication is carried out, previously stored in accordance with the destinations.

On the other hand, when a message confirmation signal (hereinafter referred to as "MCF") is sent from the receiving station device (S5), a determination is made that normal image transmission can be performed and it is no longer necessary to update D1. Accordingly, a disconnect signal (hereinafter referred to as "DCN") is generated (S9), thereby terminating the communication (S10). Thereafter, as communication management information D1 is employed and the communication result report is output (S1105).

When communication information of the receiving station device (hereinafter referred to as "D2") is sent from the receiving station device (S6), information D1 regarding stored communication information of the address of the receiving station device is updated to D2 (S7). Then, the high-speed modem is used again to transmit TRN, D1, TSI, DCS, PIX, and PPS-EOP.

When it receives MCF (S5), D1 updated by D2 is employed as communication management information to output the communication result report (S1105).

D1 will now be described. As described above, D1 is information of the receiving station devices stored in accordance with their addresses. The contents of this information are as follows:

(1) recording sheet size of the receiving station device (whether A4 size, B4 size, are provided, whether there are limitations to recording paper length), (2) abbreviated name of user of receiving device, (3) telephone number of receiving device, (4) communication mode capacity (confidential reception possible/not possible, relay reception possible/not possible), and (5) communication mode capacity (whether V. 27 ter, V. 29, V. 17, possible).

On the other hand, after calling, with line acquisition performed (S11), the receiving device waits NSS to be transmitted from the transmitting device of the receiving station (S12). When NSS is detected and the mode is in compatible mode, it transmits CFR (S13) to receive TRN, D1, TSI, DCS, PIX, and PPS-EOP employing a high-speed modem (S14, S15). Thereafter, a comparison is made between the information D1 transmitted by the transmitting device and the communication information D2 of one's own device (S16). If information D2 and D1 are the same, after reception of PPS-EOP, it sends MCF (S18).

If D1 and D2 are not the same, or when proper reception of image signals and communication information due to, for example, a difference in transmission speed could not be achieved, D2 is transmitted by a low-speed modem (S17) to receive again TRN, D1, TSI, DCS, PIX, and PPS-EOP by the high-speed modem.

After sending MCF, the received image is output onto recording paper (S1181). Then, if it receives DCN while waiting to receive DCN (S1182), the line opens (S1183), thus completing the reception.

Figure 5:
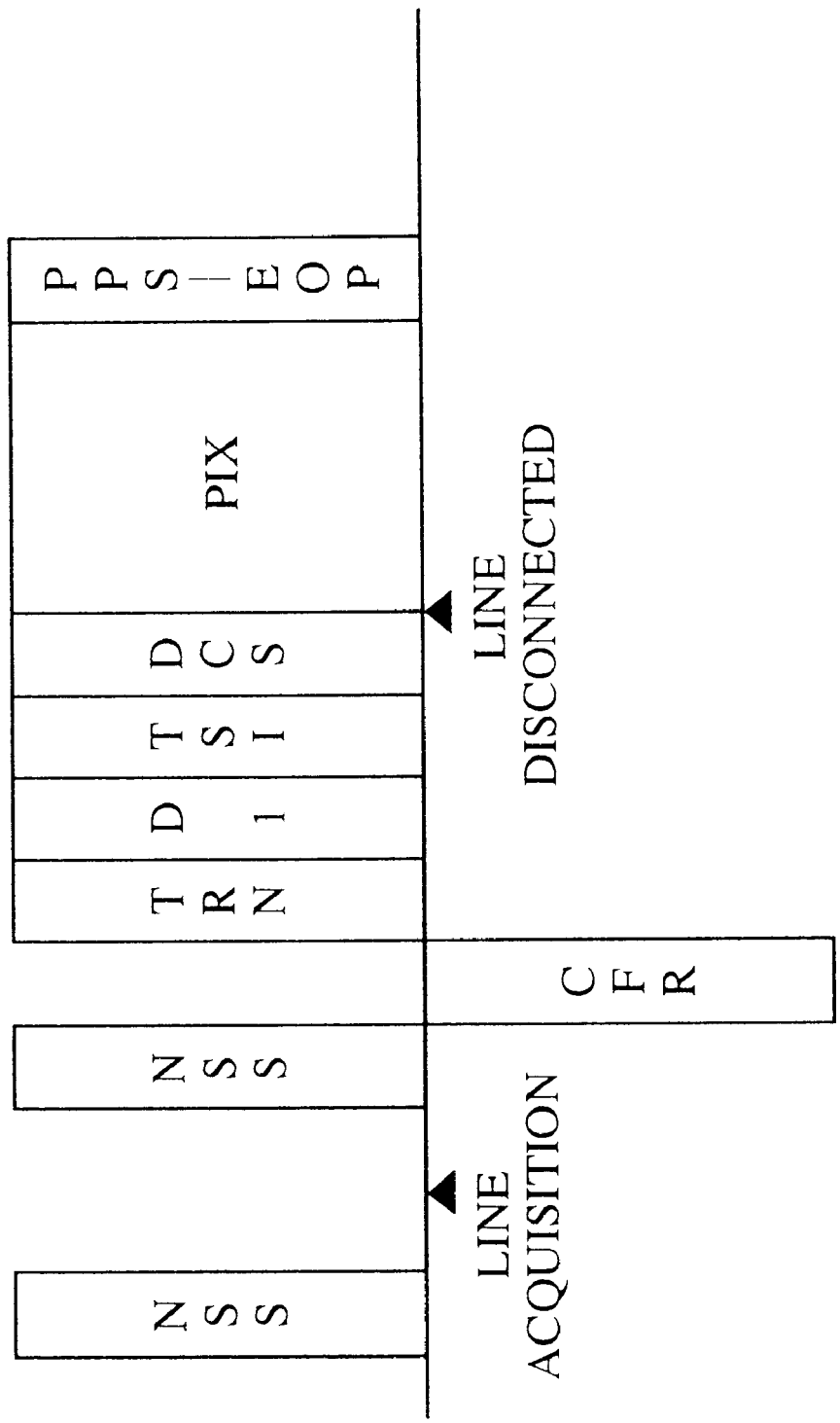
FIG. 5 is an explanatory view of a communication procedure system in a second embodiment of the present invention.
Figure 6:
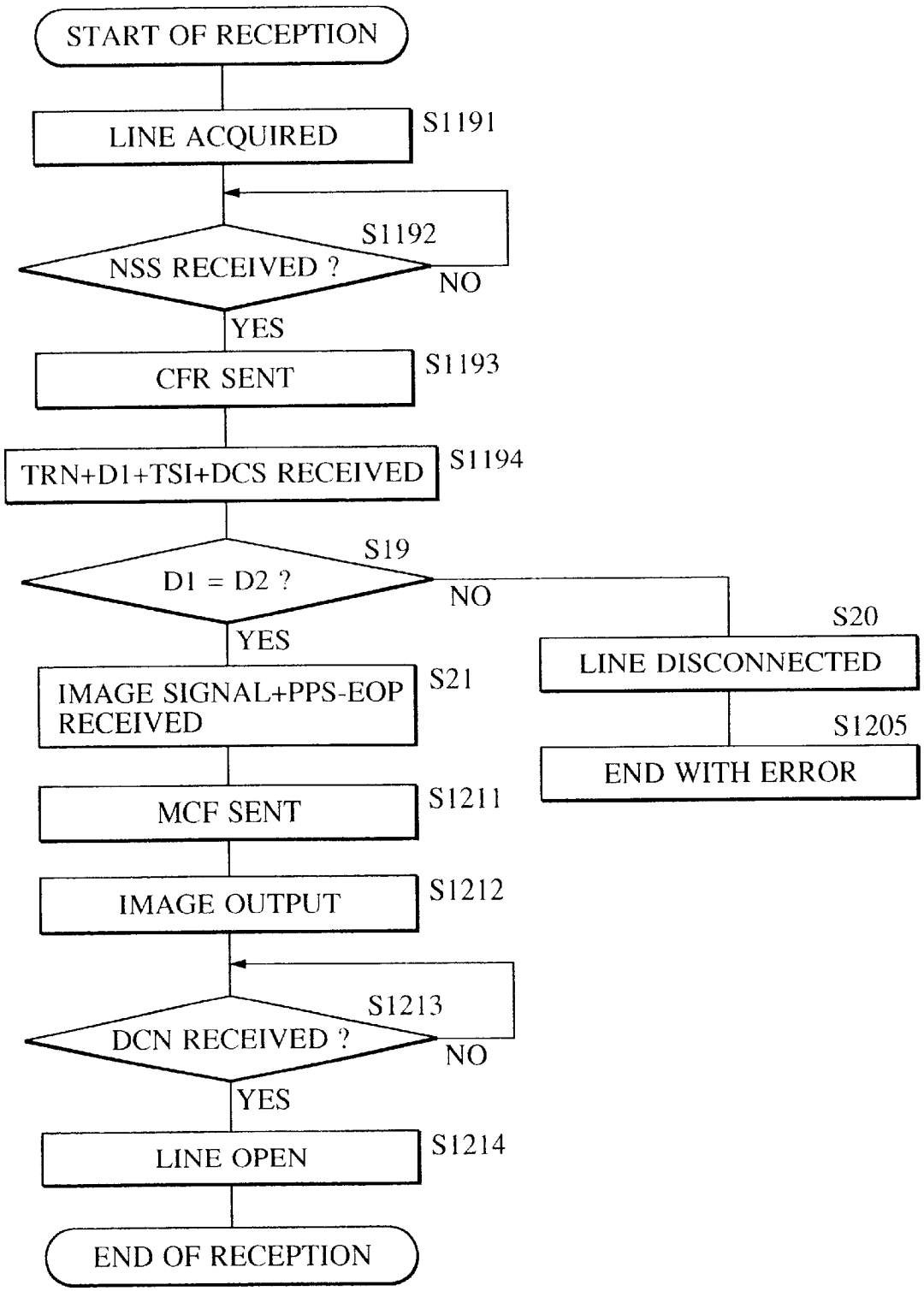
FIG. 6 is a flow chart of operation of a receiving device in the aforementioned second embodiment.

FIG. 5 is an explanatory view of a communication procedure system in a second embodiment of the present invention. FIG. 6 is a flow chart of the operation of a receiving device in the aforementioned second embodiment.

The transmitting device of the second embodiment transmits D1. When this transmission is properly completed, the content of stored information D1 is held as it is. When this transmission is completed with an error, re-dialing is executed to perform communication by a standard procedure in conformity with ITU-T recommendation T. 30 during which D1 is updated.

After calling, with line acquisition performed (S1191), the receiving device of the second embodiment waits for NSS to be transmitted from the transmitting device of the receiving station (S1192). When reception of NSS is detected and the mode is in compatible mode, it transmits CFR (S1193). Thereafter, it receives TRN, D1, TSI, and DCS transmitted from the transmitting device by the high-speed modem.

When information D1 transmitted from the transmitting side is compared with the communication information D2 of one's own device (S19) and are the same, the receiving device continues the communication (S21). On the other hand, when they are different, the line is disconnected one-sidedly and a communication error is deliberately generated to the receiving station device (S20), thereby ending the process with an error (S1205).

In S21, the receiving device receives an image signal and PPS-EOP. When the image signal is properly received, it transmits MCF (S1211). The received image is output onto recording paper (S1212). When it receives DCN while waiting to receive DCN from the receiving station device (S1213), the line opens (S1214), thus terminating the reception.

Figure 7:
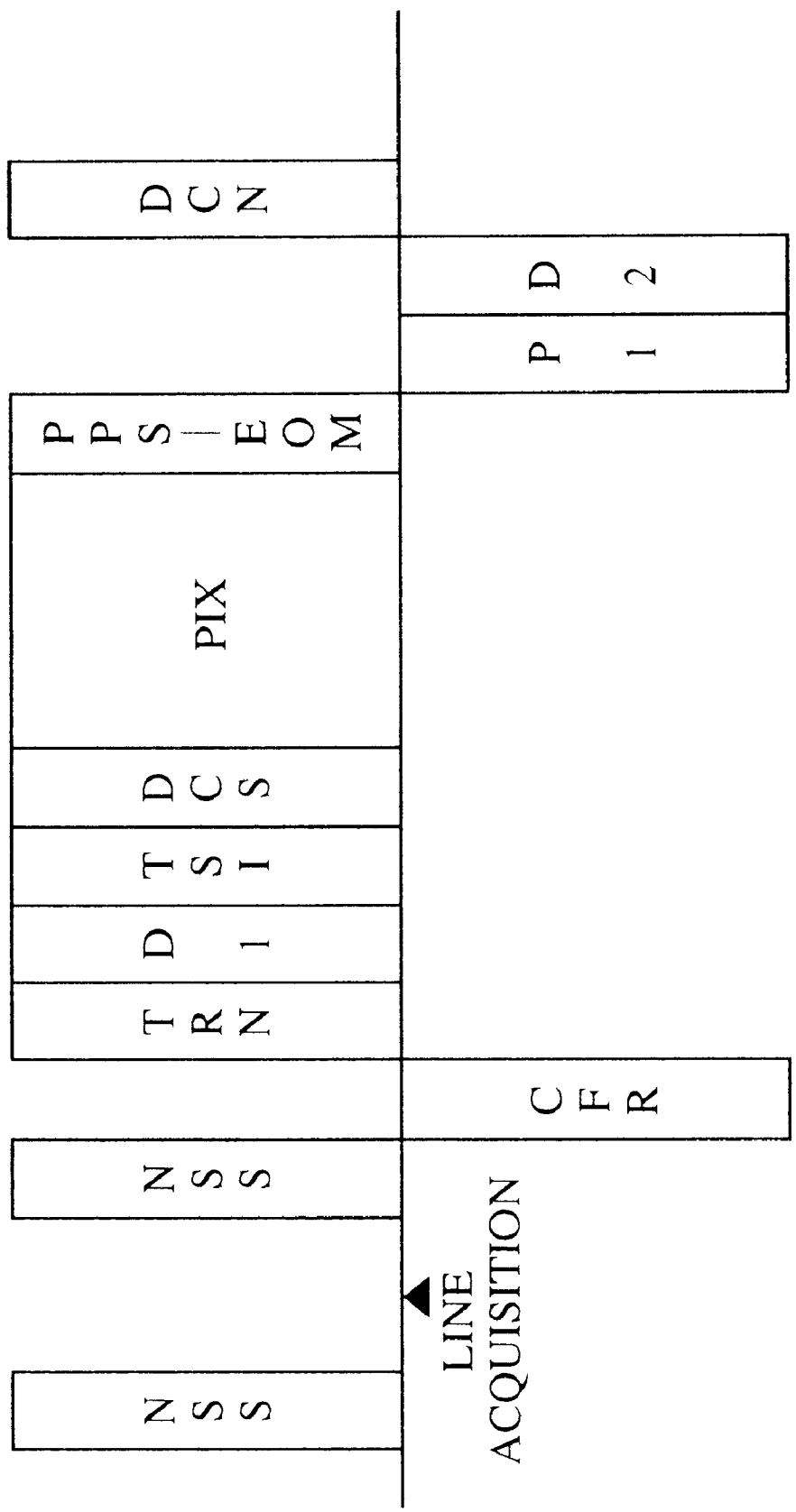
FIG. 7 is an explanatory view of a communication procedure system in a third embodiment of the present invention.
Figures 8, 8A:
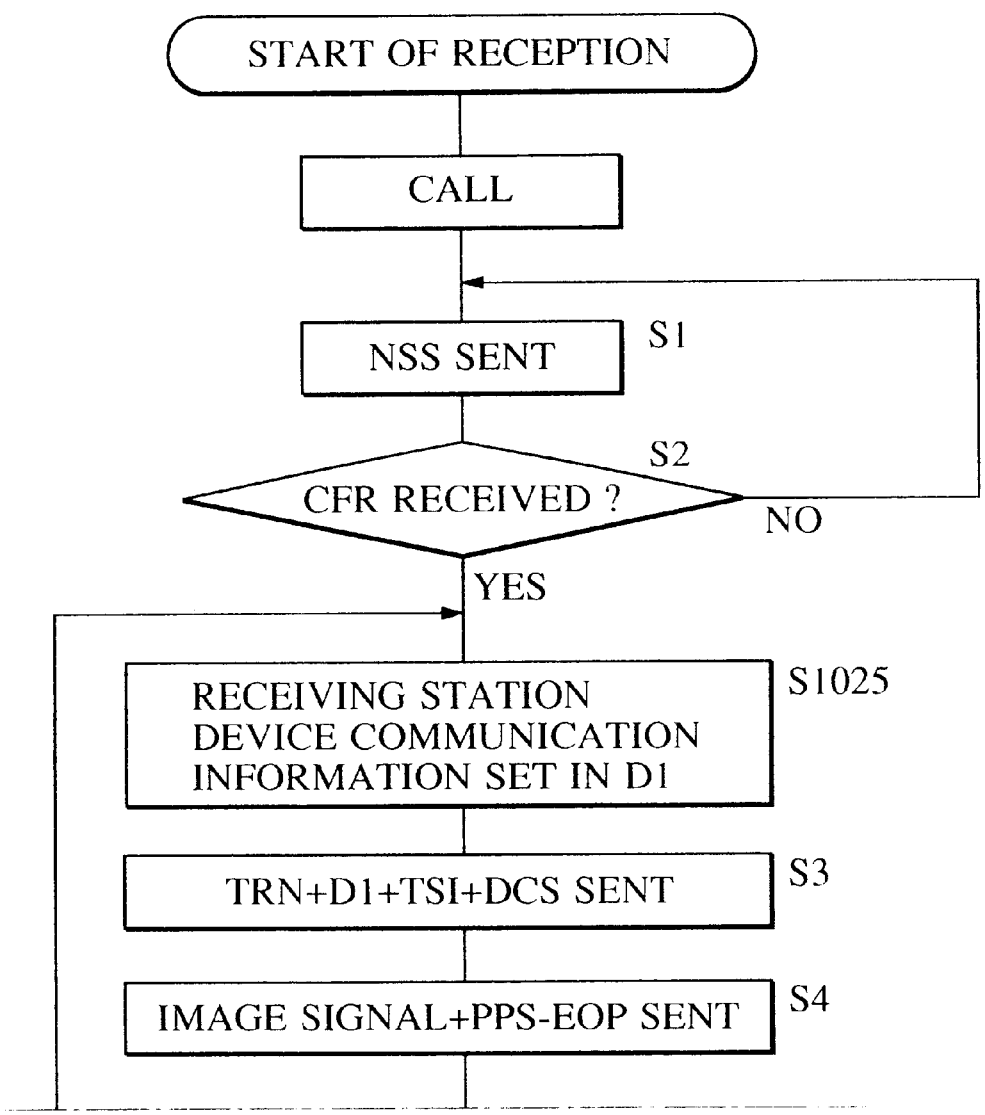
FIG. 8, consisting of FIGS. 8A and 8B, is a flow chart of operation of a transmitting device in the aforementioned third embodiment.
Figure 9:
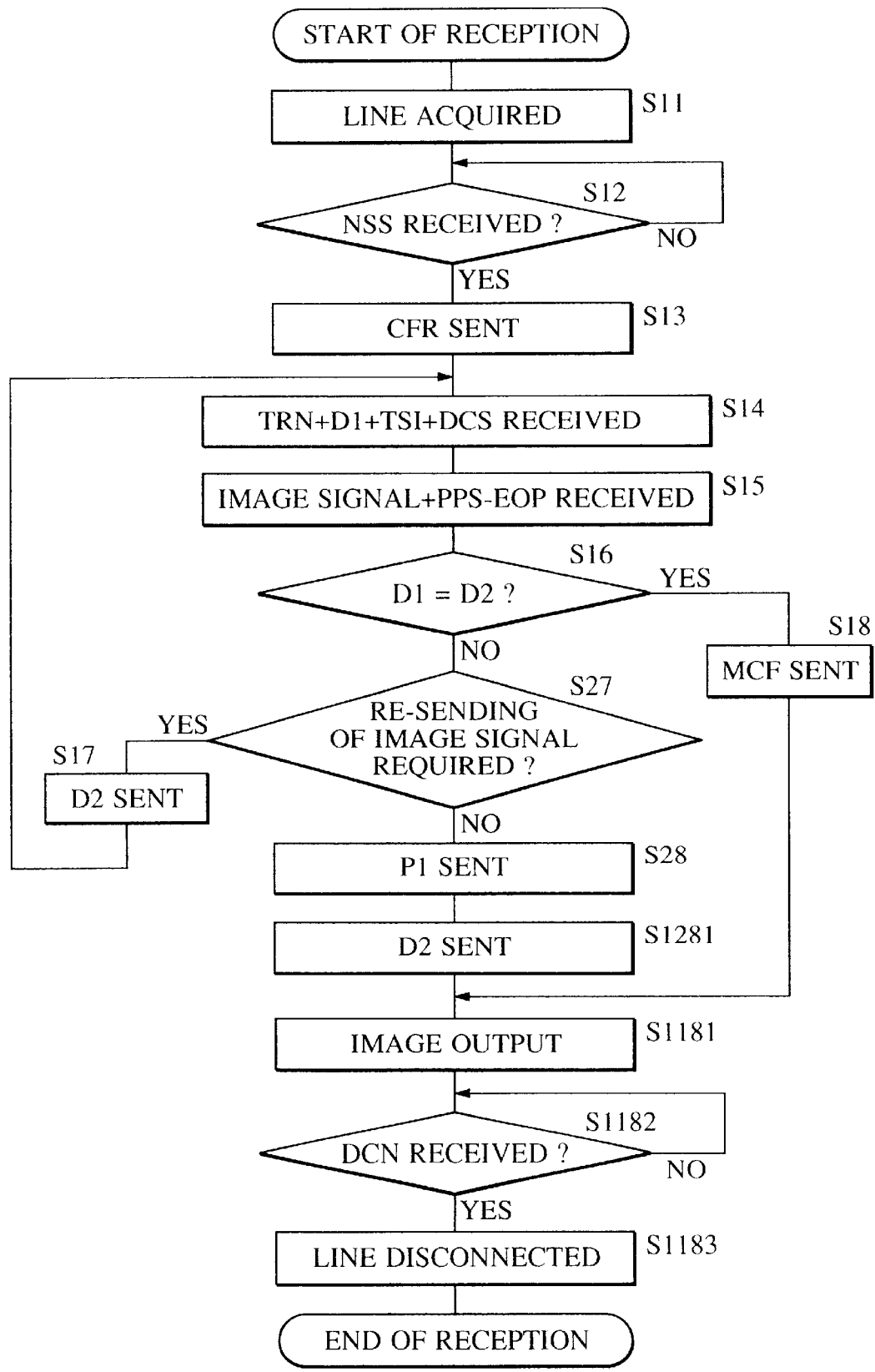
FIG. 9 is a flow chart of operation of a receiving device in the third embodiment.

FIG. 7 is an explanatory view of a communication procedure system in a third embodiment of the present invention. FIG. 8 is a flow chart of operation of a transmitting device in the aforementioned third embodiment. FIG. 9 is a flow chart of operation of a receiving device in the third embodiment. The same operations as those in the first embodiment are given the same reference numerals and description thereof will be omitted.

In the communication procedure (FIG. 3) in the aforementioned first embodiment, as illustrated in FIG. 8, when D2 as well as a signal signifying that re-transmission of an image signal is not required (P1) are sent (S23), the transmitting device updates D1 (S24), followed by transmission of DCN, after which the communication is terminated.

In the communication procedure (FIG. 4) in the aforementioned first embodiment, as illustrated in FIG. 9, when D1 and D2 are different but reception of the image signal can be properly performed and it is determined that re-transmission of the image signal is not required (S27), the receiving device transmits D2 as well as P1 (S28, S1281).

Figure 11:
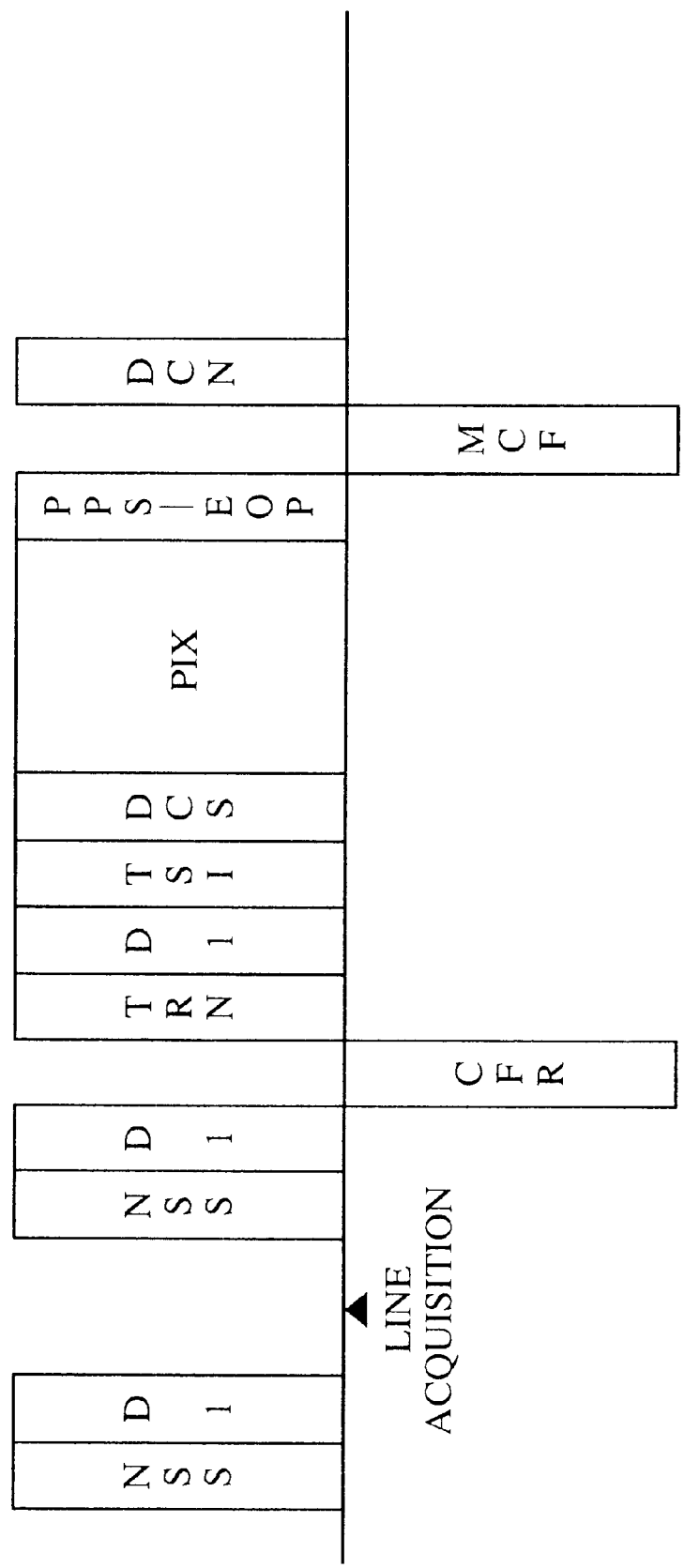
FIG. 11 is an explanatory view of a communication procedure system in a fourth embodiment of the present invention.
Figure 12:
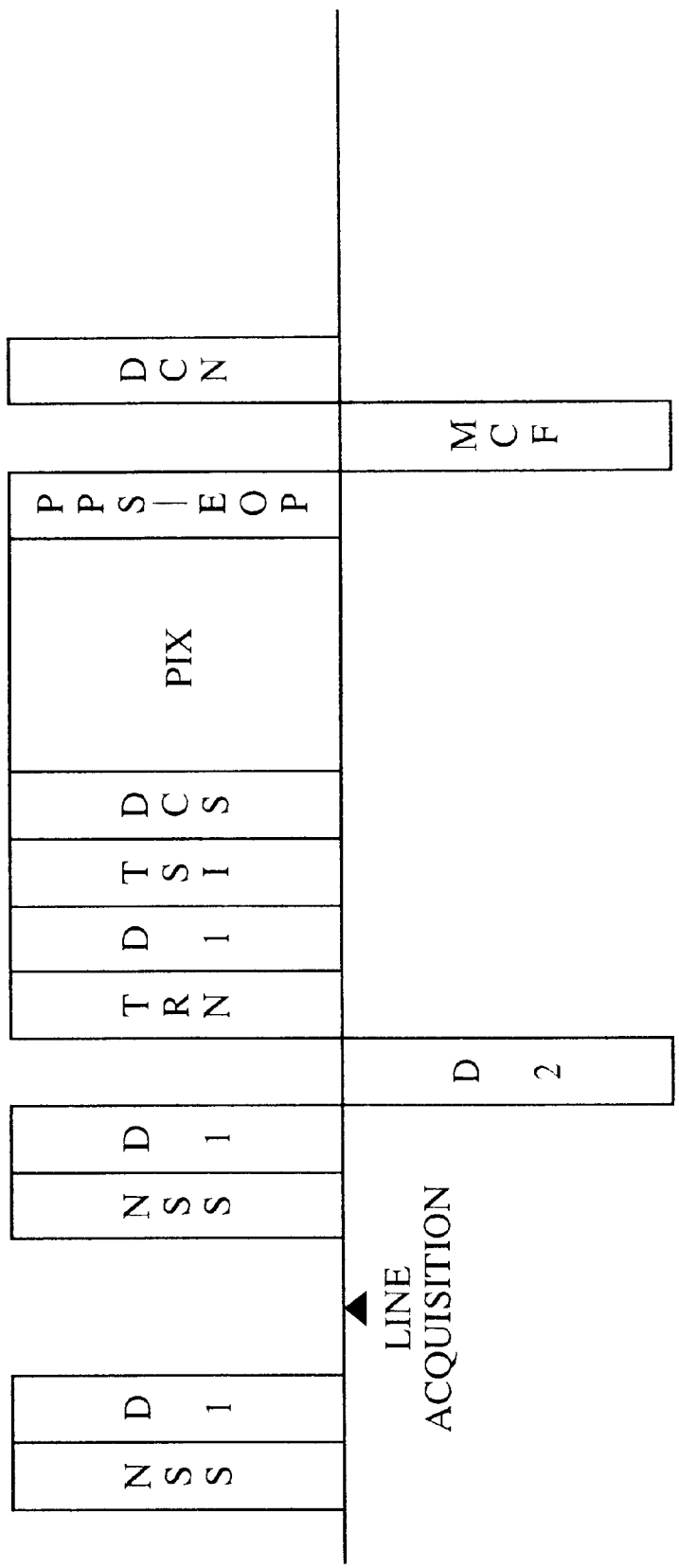
FIG. 12 is an explanatory view of a communication procedure system in the aforementioned fourth embodiment.
Figure 13:
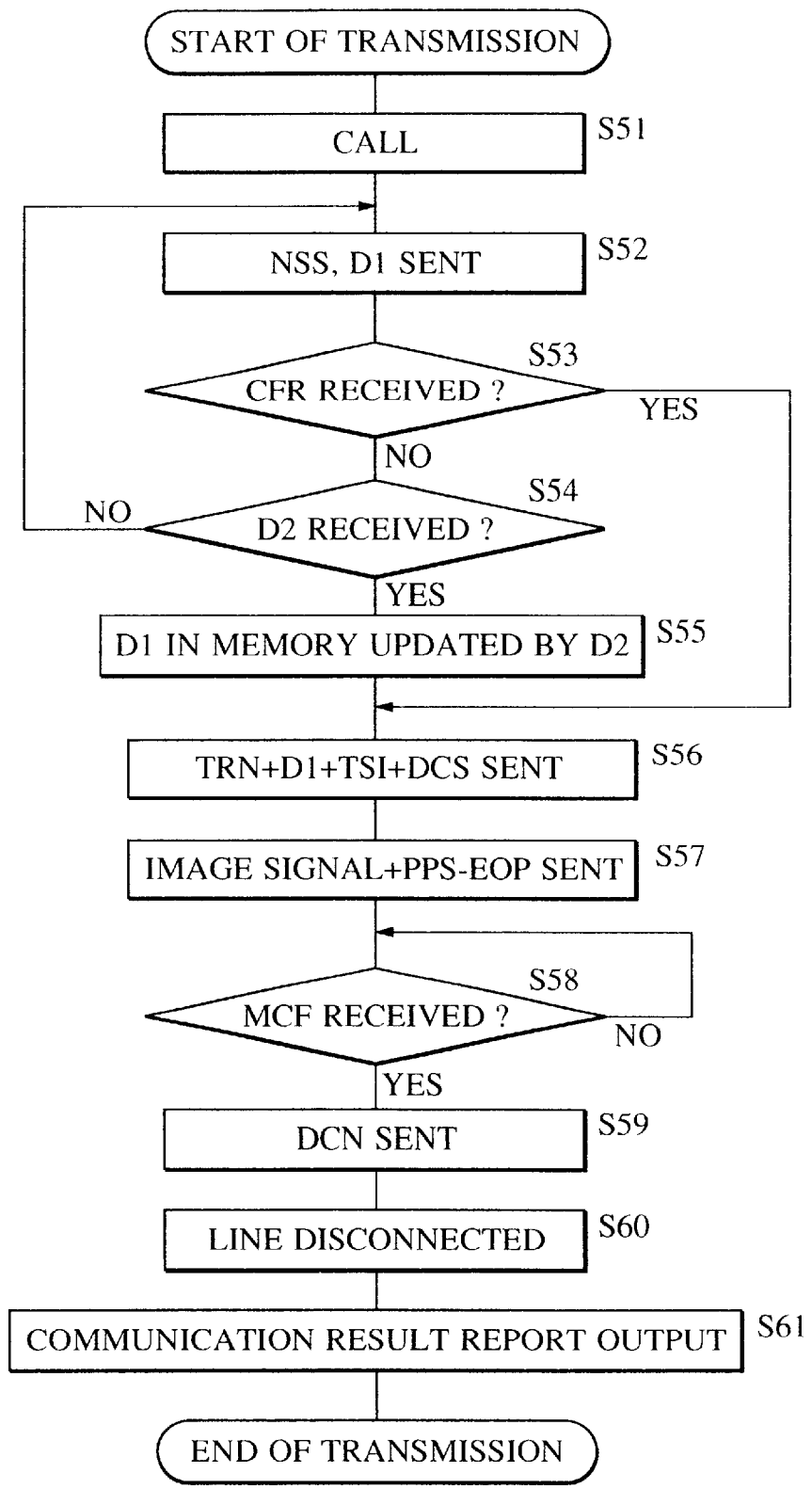
FIG. 13 is a flow chart of operation of a transmitting device in the fourth embodiment.

FIGS. 11 and 12 are each explanatory views of the communication procedure system in a fourth embodiment of the present invention, while FIG. 13 is a flow chart of operation of a transmitting device in the fourth embodiment.

The transmitting device transmits immediately after dialing, receiving device information D1 of the receiving station as well as the NSS signal (S52).

After reception of CFR (S53), TRN, D1, TSI, and DCS are transmitted by a high-speed modem, followed by transmission of image signal and message end signal (S57).

When a D2 signal is received instead of CFR (S54), the address information D1 is updated by D2 (S55), followed by transmission of TRN, D1, TSI, DCS, PIX, and PPS-EOP.

Figure 14:
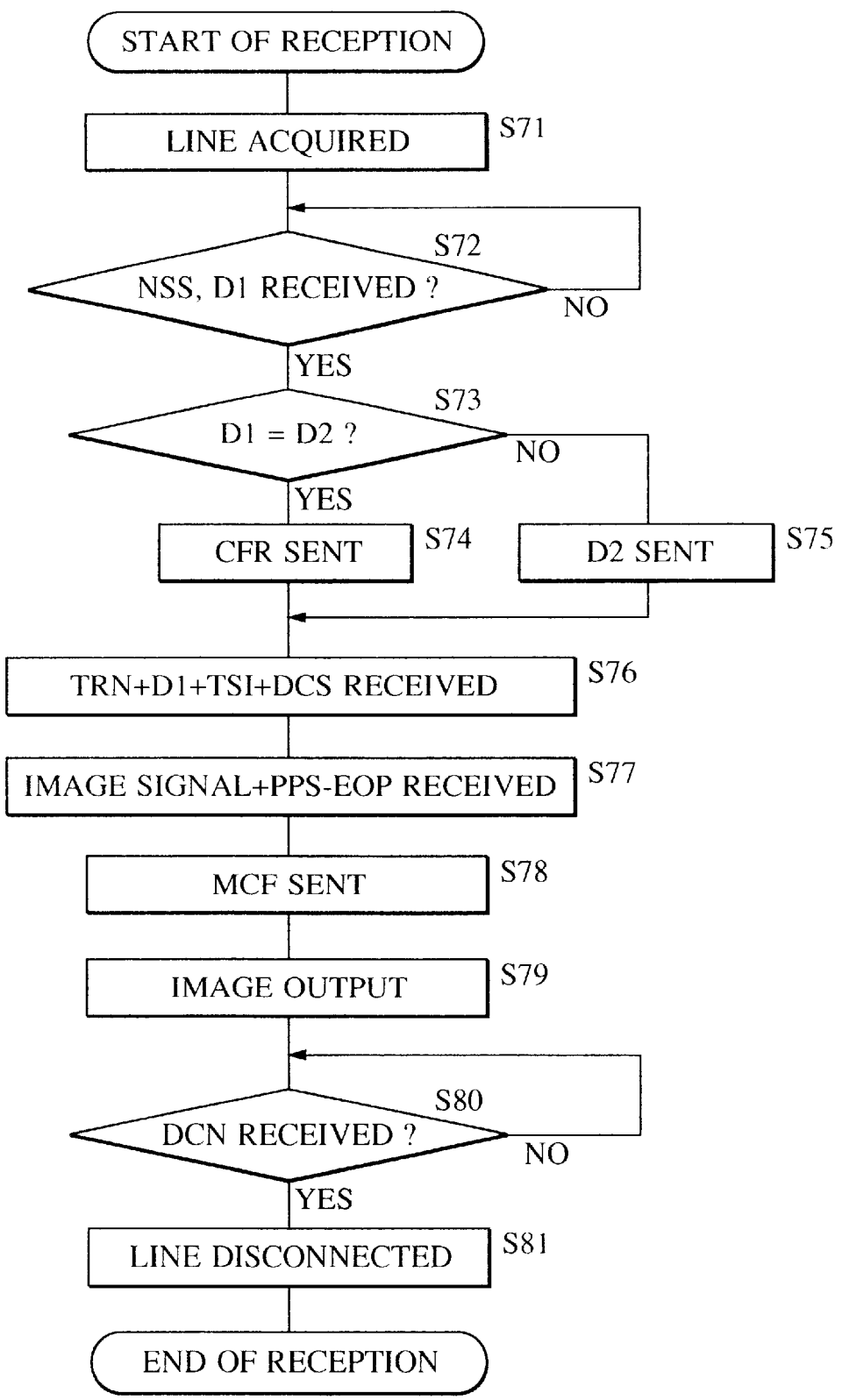
FIG. 14 is a flow chart of operation of a receiving device in the fourth embodiment.

FIG. 14 is a flow chart of operation of a receiving device of the fourth embodiment.

After the reception is detected, with line acquisition performed (S71), the receiving device receives NSS and D1 signals (S72). When the received NSS and D1 signals and the information D2 of one's own device match, it transmits a CFR signal (S74) and receives TRN, D1, TSI, DCS, PIX, and PPS-EOP (S76, S77).

When the received NSS and D1 signals and D2 of one's own device do not match, it transmits the D2 signal (S75).

Thereafter, it receives TRN, D1, TSI, DCS, PIX, and PPS-EOP signals (S76, S77).

When the received image signal is the correct signal, the receiving device transmits MCF (S78) and the received image signal is output onto recording paper (S79). Further, when it receives DCN (S80), the line is opened (S81), thus terminating the reception.

As described above, according to the present invention, during communication, it is possible to automatically update the communication information of the receiving station device, so as to eliminate the conventional problem that communication information of the receiving device of the receiving station stored in the transmitting device differs from the actual information of the receiving device, which makes communication difficult.

What is claimed is:

1. A facsimile device having means for storing communication information of communication devices of receiving stations in accordance with the receiving stations registered by means of a one-touch dialling function or abbreviated dialling function, by which ITU-T non-standard communication procedure is executed so as to allow the required time for performing the procedure to be reduced, said facsimile device comprising:

means for transmitting stored communication information when said facsimile device is used as transmitting station of image data to receiving station of image data registered by means of the one-touch dialling function or abbreviated dialling function;

means for comparing communication information of one's own device transmitted from the transmitting station with the actual communication information of one's own device and, if there is a difference, for transmitting new communication information to the transmitting station, when said facsimile device is used as a receiving station; and means for updating said stored communication information when the new communication information is transmitted from the receiving station, and when said facsimile device is used as a transmitting station.

2. A facsimile device having means for storing communication information of communication devices of receiving stations in accordance with the receiving stations registered by means of a one-touch dialling function or abbreviated dialling function, by which ITU-T non-standard communication procedure is executed so as to allow the required time for performing the procedure to be reduced, said facsimile device comprising:

means for transmitting stored communication information when said facsimile device is used as transmitting station of image data to receiving station of image data registered by means of the one-touch dialling function or abbreviated dialling function;

means for comparing communication information of one's own device transmitted from the transmitting station with the actual communication information of one's own device and, if there is a difference, one-sidedly terminating communication between the transmitting station and the receiving station to deliberately generate a communication error, when said facsimile device is used as the receiving station; and means for performing communication by a standardized procedure in conformity with the ITU-T recommendation T. 30 in carrying out the next communication with the same receiving station after it has updated stored communication information of the receiving station, when a communication error occurs, and when said facsimile device is used as the transmitting station.

3. A facsimile device according to claim 1, wherein:

said facsimile device is used for executing the procedure for image signal transmission without waiting for a signal from the receiving station following transmission of communication information of the receiving station, and performing ECM communication using an image signal error correction function, and wherein said facsimile device includes:

means for updating stored communication information of the receiving station to retransmit from the beginning an image signal based on new communication information, when new communication information is transmitted from the receiving station after the first block end signal is transmitted following transmission of the image signal, when said facsimile device functions as a transmitting device; and means for transmitting new communication information and receiving again an image signal, either when communication information of one's own device transmitted from a transmitting station differs from the actual communication information of one's own device or when an image signal or communication information could not be received, when said facsimile device functions as a receiving device.

4. A facsimile device according to claim 3, wherein said facsimile device comprises:

means for updating stored communication information of the receiving station to continue communication, when, after transmission of the first block end signal, new communication information as well as re-transmission not-required signal indicating that an image signal re-transmission is not required are transmitted from the receiving station, when said facsimile device functions as a transmitting device; and means for transmitting, after reception of the first block end signal, new communication information as well as said re-transmission not-required signal, when proper reception of an image signal can be performed and it is determined that re-transmission of an image signal is not required, even when communication information transmitted from the transmitting station is different from the information of one's own device, when said facsimile device functions as a receiving device.

5. A facsimile device according to claim 1, wherein:

said facsimile device is used for executing the procedure for image signal transmission without waiting for a signal from the receiving station following transmission of communication information of the receiving station, and performing ECM communication using an image signal error correction function, and wherein said facsimile device includes:

means for updating stored communication information of the receiving station to transmit an image signal based on new communication information of the receiving station device, when new communication information is transmitted from the receiving station before image signal transmission, when said facsimile device functions as a transmitting device; and means for transmitting new communication information and receiving an image signal, when the transmitting station differs from the actual communication information of one's own device when said facsimile device functions as a receiving device.

6. In a facsimile device, the combination of:

a storage device in which is stored information of maximum facility of a remote destination apparatus, which information of maximum facility includes a modem speed capacity of said remote destination apparatus;

a communication device which is constructed to perform facsimile transmission with said remote destination apparatus according to the information of maximum facility of said remote destination apparatus, which information of maximum facility is stored in said storage means, and which facsimile transmission includes a high speed image signal; and a controller which is connected to said communication device so that said communication device can transmit to said remote destination apparatus, together with said facsimile transmission which includes said high speed image signal, the information of maximum facility of said remote destination apparatus, which is stored in said storage device, whereby the information of maximum facility of said remote destination apparatus stored in said storage device can be confirmed.

7. A facsimile device according to claim 6 wherein:

said control device has said communication device transmit data according to the information of maximum facility of said remote destination apparatus stored in said storage device without receiving the information of maximum facility of said remote destination apparatus from said remote destination apparatus, and has said communication means transmit the information of maximum facility of said remote destination apparatus to said remote destination apparatus for confirming the information of maximum facility of said remote destination apparatus stored in said storage device.

8. A facsimile device according to claim 6, wherein:

the information of maximum facility of said remote destination apparatus received from said remote destination apparatus by said communication means is stored in said storage device.

9. A facsimile device according to claim 6, wherein:

said facsimile transmission comprises a high speed modem training signal, a transmitting subscriber identification signal, a digital command signal, an image signal and a partial page-end of procedure signal; and wherein said information of maximum facility is accompanied by information of facility which includes the communication mode speed capacity of the remote destination apparatus.

10. A method of facsimile communication comprising:

storing information of maximum facility of a remote destination apparatus, said information of maximum facility including a modem speed capacity of said remote destination apparatus;

performing facsimile transmission with said remote destination apparatus according to the stored information of maximum facility of said remote destination apparatus, said facsimile transmission including transmission of a high speed image signal; and in association with said facsimile transmission including said high speed image signal, transmitting to said remote destination apparatus, the stored information of maximum facility of said remote destination apparatus and confirming the correctness of the stored information of maximum facility of said remote destination apparatus based on information received from said remote destination apparatus.

11. A method according to claim 10, wherein:

data is transmitted according to the information of maximum facility of said remote destination apparatus stored in said storage means without receiving the information of maximum facility of said remote destination apparatus from said remote destination apparatus, and wherein the information of maximum facility of said remote destination apparatus is transmitted to said remote destination apparatus for confirming the information of maximum facility of said remote destination apparatus stored in said storage means.

12. A method according to claim 10, wherein:

the information of maximum facility of said remote destination apparatus received from said destination is stored.

13. A method of facsimile communication according to claim 10, wherein:

said facsimile communication comprises a high speed modem training signal, a transmitting subscriber identification signal, a digital command signal, an image signal and a partial page-end of procedure signal; and wherein said information of maximum facility includes the communication mode speed capacity of the remote destination apparatus.

14. A method of facsimile communication comprising:

receiving information of maximum facility of one's own apparatus from a remote destination apparatus in which said information of maximum facility is stored, said information of maximum facility including a modem speed capacity of one's own apparatus;

receiving, together with said information of maximum facility of one's own apparatus, a high speed image signal;

discriminating whether the received information of maximum facility of said one's own apparatus is correct;

performing correction, in said remote destination apparatus, of stored information of maximum facility of said one's own destination apparatus, when said discriminating ascertains that the received information of maximum facility of said one's own destination apparatus is incorrect; and, when said information is incorrect, thereafter receiving again said high speed image signal from said remote destination apparatus.

15. A method of facsimile communication according to claim 14, and further including the step of receiving a facsimile communication which comprises a high speed modem training signal, a transmitting subscriber identification signal, a digital command signal, an image signal and a partial page-end of procedure signal; and wherein said information of maximum facility includes the communication mode speed capacity of the remote destination apparatus.

16. In a facsimile apparatus, the combination of:

storage means for storing information of facility of a destination device;

communication means for performing communication with said destination device according to the information of facility of said destination device stored in said storage means; and control means for having said communication means transmit at high speed to said destination device, modem training information, stored communication information regarding the destination device, transmitter identification information, digital command information, image information and end of procedure information, together with the information of facility of said destination device for confirming the information of facility of said destination device stored in said storage means.

17. In a method of facsimile communication comprising, the steps of:

storing information of facility of a destination device;

performing high speed communication of modem training information, stored communication information regarding the destination device, transmitter identification information, digital command information, image information and end of procedure information, to said destination device according to the information of facility of said destination device stored in said storage means; and in association with said communication, transmitting the information of facility of said destination apparatus to said destination device, for confirming the information of facility of said destination device stored in said storage means.

18. In a facsimile destination device for receiving information from a facsimile apparatus, the combination of:

receiving means for receiving modem training information, stored communication information regarding the destination device, transmitter identification information, digital command information, image information and end of procedure information, together with information of facility of said destination device transmitted at high speed from a facsimile apparatus;

discrimination means for discriminating whether the information of facility of said destination device received by said receiving means is correct; and performing means associated with said receiving means for performing a correction operation when said discrimination means discriminates that the information of facility of said destination device is incorrect.

19. In a method of facsimile communication, the steps of:

receiving, at a destination device, modem training information, stored communication information regarding the destination device, transmitter identification information, digital command information, image information and end of procedure information, together with information of facility of said destination device transmitted at high speed;

discriminating whether the information of facility of said destination device received at said destination device is correct; and performing a correction operation when said discriminating ascertains that the information of facility of said destination device is incorrect.

20. In a facsimile device, the combination of:

a receiver connected to receive, together with a high speed image signal, a signal containing information of maximum facility of said receiver from a remote facsimile apparatus, said information of maximum facility including a modem speed capacity of said receiver;

a signal discriminator connected to said receiver, said signal discriminator being constructed to discriminate whether the information of maximum facility contained in the signal received by said receiver is correct and, when said information of maximum facility is correct, to cause said receiver to process said high speed image signal received therewith, and for producing an indication when the information is not correct; and a switch connected in said receiver, said switch being arranged to disconnect said receiver from said remote facsimile apparatus when the discriminator indicates that the received information is not correct.

21. A facsimile device according to claim 20, wherein:

said receiver is constructed to receive, together with a facsimile communication which comprises a high speed modem training signal, a transmitting subscriber identification signal, a digital command signal, an image signal and a partial page-end of procedure signal, said information of maximum facility; and wherein said information of maximum facility includes the communication mode speed capacity of the remote destination apparatus.

22. In a facsimile device, the combination of:

a receiver connected to receive, together with a high speed image signal, information of maximum facility of said receiver from a remote station, said information of maximum facility including modem speeds at which said receiver can operate;

a discriminator connected to said receiver for discriminating whether the information of maximum facility received by said receiver is correct and for producing an indication when the received information of maximum facility is not correct and, where said information of maximum facility is correct, to cause said receiver to process said high speed received therewith;

a signal transmitting device connected to send corrected information of maximum facility of said receiver to the remote station in response to an indication that the received information of maximum facility is not correct; and, said receiver being capable of thereafter receiving said high speed image signal again when said received information of maximum facility is not correct.

23. A facsimile device according to claim 22, wherein:

said receiving means is constructed to receive, together with said information of maximum facility, a facsimile transmission which comprises a high speed modem training signal, a transmitting subscriber identification signal, a digital command signal, an image signal and a partial page-end of procedure signal; and wherein said information of maximum facility includes the communication mode speed capacity of the remote destination apparatus.

24. A method of facsimile communication comprising:

receiving, at a local station, together with a high speed image signal, information of maximum facility of said local station from a remote destination apparatus, said information of facility including a modem speed capacity of said remote destination apparatus;

discriminating whether the received information of maximum facility of said local station received at said local station is correct;

processing said high speed image signal when said information of maximum facility is correct; and disconnecting said local station from said remote destination apparatus if the received information of maximum facility is not correct.

25. A method of facsimile communication according to claim 24, further including the step of receiving a facsimile transmission which comprises a high speed modem training signal, a transmitting subscriber identification signal, a digital command signal, an image signal and a partial page-end of procedure signal; and wherein said information of maximum facility includes the communication mode speed capacity of the remote destination apparatus.

26. A method of facsimile communication comprising:

receiving, at a local station, together with a high speed image signal, information of maximum facility of said local station from a remote destination station, said information of maximum facility including a modem speed capacity of said local station;

discriminating whether the received information of maximum facility of said local station is correct;

processing said high speed image signal if the received information of maximum facility is correct;

sending corrected information of maximum facility to the remote station if the received information of maximum facility is incorrect; and, if said received information is incorrect, thereafter receiving at said local station a new high speed image signal from said remote destination station.

27. A method of facsimile communication according to claim 26, and further including the step of receiving a facsimile transmission which includes a high speed modem training signal, a transmitting subscriber identification signal, a digital command signal, an image signal and a partial page-end of procedure signal; and wherein said information of maximum facility includes the communication mode speed capacity of the remote destination apparatus.

* * * * *